United States Patent [19]
Sergeant et al.

[11] Patent Number: 5,517,236
[45] Date of Patent: May 14, 1996

[54] VIDEO SURVEILLANCE SYSTEM

[75] Inventors: Ronald G. Sergeant, High Point, N.C.;
Scott A. Corbin, Stevens, Pa.;
Theodore L. Jones, Akron, Pa.; Gopi
N. Mehrotra, Lancaster, Pa.; Jennifer
L. Randall, Lancaster, Pa.

[73] Assignee: Philips Electronics North America Corporation, New York, N.Y.

[21] Appl. No.: 263,782

[22] Filed: Jun. 22, 1994

[51] Int. Cl.$^6$ .................................................. H04N 7/18
[52] U.S. Cl. ...................... 348/143; 348/153; 348/159; 348/213; 348/512
[58] Field of Search .................................. 348/143, 153, 348/159, 211, 212, 213, 347, 367, 368, 512, 516, 518; H04N 7/18

[56] References Cited

U.S. PATENT DOCUMENTS

| | | | |
|---|---|---|---|
| D.307,915 | 5/1990 | Knester, III | D16/203 |
| D. 340,940 | 11/1993 | Ellenberger et al. | D16/242 |
| 4,293,876 | 10/1981 | Williams | 348/214 |
| 4,833,534 | 5/1989 | Paff et al. | 348/151 |
| 4,918,473 | 4/1990 | Blackshear | 348/143 |
| 4,945,367 | 7/1990 | Blackshear | 348/143 |
| 4,974,088 | 11/1990 | Sasaki | 348/213 |
| 4,984,089 | 1/1991 | Stiepel et al. | 348/143 |
| 5,111,288 | 5/1992 | Blackshear | 348/143 |
| 5,164,827 | 11/1992 | Paff | 348/143 |
| 5,206,732 | 4/1993 | Hudson | 348/211 |
| 5,223,872 | 6/1993 | Stiepel et al. | 348/143 |
| 5,243,425 | 9/1993 | Thompson | 348/500 |
| 5,305,100 | 4/1994 | Choi | 348/159 |

*Primary Examiner*—Howard W. Britton
*Attorney, Agent, or Firm*—Dann, Dorfman, Herrell and Skillman

[57] ABSTRACT

A video surveillance system includes a plurality of remote surveillance units, each of which has a video camera mounted in a dome housing. The video camera is panned and/or tilted to a desired orientation within the dome by a pan motor and/or a tilt motor. The surveillance system also includes a keyboard for entering user commands, a joystick for controlling the positioning of the cameras, a central processing unit for interpreting the user commands and the joystick movements, and a communication system for issuing operating commands to the remote surveillance units. Each remote surveillance unit is constructed and arranged to store and to recall selected camera control parameters in association with selected pan and tilt coordinates in response to commands entered by the user. The camera control parameters include white balance, focus, and shutter speed settings for the camera. Additionally, automatic control of the camera exposure, white balance, and focus is provided. Video signals from the remote surveillance units are received by a video switcher/multiplexer under the control of a central processing unit. The video switcher/multiplexer includes an automatic phase adjustment system for synchronizing the video signals from the remote surveillance units.

24 Claims, 4 Drawing Sheets

VIDEO SURVEILLANCE SYSTEM

FIELD OF THE INVENTION

The present invention relates to video surveillance systems. More particularly, the invention relates to a surveillance system wherein a plurality of compact cameras are installed in a plurality of remote locations and wherein various operational parameters of the cameras are stored and retrieved to effect rapid adjustment of each camera.

BACKGROUND OF THE INVENTION

Video surveillance systems are known wherein video cameras are deployed at remote locations that are desired to be monitored by security personnel. In such systems, images from several cameras are displayed on one or more video monitors at a security console. By having a single person remotely monitoring a large number of locations, a considerable cost advantage can be realized compared to employing several people to be stationed in the locations of interest.

Traditionally, the video cameras employed in such surveillance systems have been somewhat unsophisticated relative to video cameras used in television broadcasting systems or cameras intended for home use. For almost every operational feature that may be incorporated into a video camera, there is a corresponding parameter that must be set and/or adjusted by the user. The need for such adjustments is not an overwhelming problem for the user of a single camera. However, the use of feature-laden cameras in a surveillance system having many cameras requires a significantly greater amount of the user's attention in order to set or maintain adjustments of the multitude of parameters for each camera. Even if each camera were to be initially adjusted according to a set of pre-determined parameters, the required adjustments are likely to change in response to changing camera orientations, changing lighting conditions, or other events within a monitored area. Thus, the user of a surveillance system would be distracted from the task of providing vigilant attention to activities in the monitored areas. For example, simply maintaining and adjusting a plurality of remote video cameras in focus could present a significant distraction to the user.

It would be desirable to provide a multiple-camera surveillance system wherein the cameras are capable of automatically adjusting certain operational parameters, such as the focus setting, of each of the cameras. Additionally, it would be desirable to provide a multiple-camera surveillance system wherein manual adjustments of several camera parameters can be made remotely, stored, and then retrieved in association with the reorientation of the camera.

In particular, it would be desirable to provide such storage and retrieval of parameters in connection with the focus and/or white balance of a color video camera. In order to obtain accurate color images from a video camera, it is necessary to equalize, or balance, the levels of red, green, and blue in a video signal relative to the detected levels of such colors, in accordance with the spectrum of the light in the observed area. Sunlight, for example, has a spectrum that approximates a 5,500K blackbody, hence the spectrum of reflected light from a white object will exhibit a peak in the green region. The spectra of incandescent lamps can be approximated by blackbody spectra at various temperatures depending upon the type of lamp. Still other sources of light, such as metal vapor lamps or fluorescent tubes, exhibit prominent peaks at various locations within the spectrum. A figure of merit that is used to characterize the spectrum of a light source is referred to as the color temperature of the light source. In the field of photography, colored filters are used to compensate, or equalize, the response of color film to account for various color temperatures. In electronic imaging systems, it is common to provide a variable gain device, known as a white balance system, to allow the user to equalize the response of an electronic imaging device in accordance with the prevailing color temperature.

In some applications the remote surveillance unit is employed in a location having different areas each of which can be characterized by a color temperature. For example, one area within a room may have incandescent lighting, while another area of the room may have fluorescent lighting, or a window providing sunlight. Automatic white balance systems are known wherein the levels of compensation applied to the color components of a video image are continuously adjusted in response to the measured color content of the image. Such white balance systems each rely upon a statistical assumption in regard to what the color content of a balanced image should be. If, for example, there is relatively little white actually in an area being viewed, an automatic white balance system may incorrectly distort the colors in the video image. Additionally, the continuous color adjustment provided by automatic white balance often causes color instability within the video image, particularly if there are fluctuations in the color content of the area as may be caused by movement of the camera or objects in the image.

White balance settings can be adjusted manually by the camera operator, but manual adjustment would be a distraction to the user of a video surveillance system, especially a system wherein a plurality of remotely positionable cameras are employed. It would be desirable to provide a video surveillance system in which predefined white balance settings can be stored in association with corresponding areas that may be viewed by each camera. Then, these settings can be automatically retrieved, and applied to the detected video image whenever the camera is reoriented to view one of the selected areas, which may have a different color temperature than a previously viewed area.

In some applications, it is desirable to provide the surveillance system user with the ability to set or adjust the shutter speed of a remote surveillance camera. For example, in a dimly illuminated area, a low shutter speed is generally desirable. Whereas, in a brightly illuminated area, a relatively high shutter speed is generally desirable. Additionally, a surveillance camera may be employed in an area where it is desirable to obtain a clear image of moving objects, e.g., vehicles, that may pass through the area. It would be desirable to provide the user with the ability to set or adjust the shutter speed of a remote surveillance camera depending upon the circumstances presented in the monitored area.

SUMMARY OF THE INVENTION

A surveillance system is provided wherein a plurality of remote surveillance units are arranged to receive commands from a user-operated central processing unit. Each surveillance unit is provided with a video camera and a pan/tilt mechanism for positioning the camera in response to commands received from the user. Each surveillance unit is further provided with a microcontroller for controlling the camera and the pan/tilt mechanism in response to commands received from the user. The microcontroller is also operative to store and to retrieve certain camera settings, in association with selected orientations of the pan/tilt mechanism, in response to commands from the user to memorize or to recall such information.

A remote surveillance unit is connected with a local source of AC power for providing electrical power to the surveillance unit. The remote surveillance unit includes circuitry for generating a line reference signal that is synchronized with the local AC source. An imaging controller receives the line reference signal and produces a synchronization reference signal which is used to generate synchronization signals within a composite video signal produced by the camera. The image controller produces a selected degree of phase lag in the synchronization reference signal relative to the line reference signal. The degree of phase lag may be remotely selected by the user in order to effect synchronization of composite video signals received from a plurality of remote surveillance units. An automatic phase adjustment circuit is provided for detecting lack of synchronization among the displayed video images and for automatically adjusting the relative phase lag among the remote surveillance units.

BRIEF DESCRIPTION OF THE DRAWINGS

The foregoing summary as well as the following detailed description of a preferred embodiment of the present invention will be better understood when read in conjunction with the appended drawings in which.

DETAILED DESCRIPTION

Figure 1:
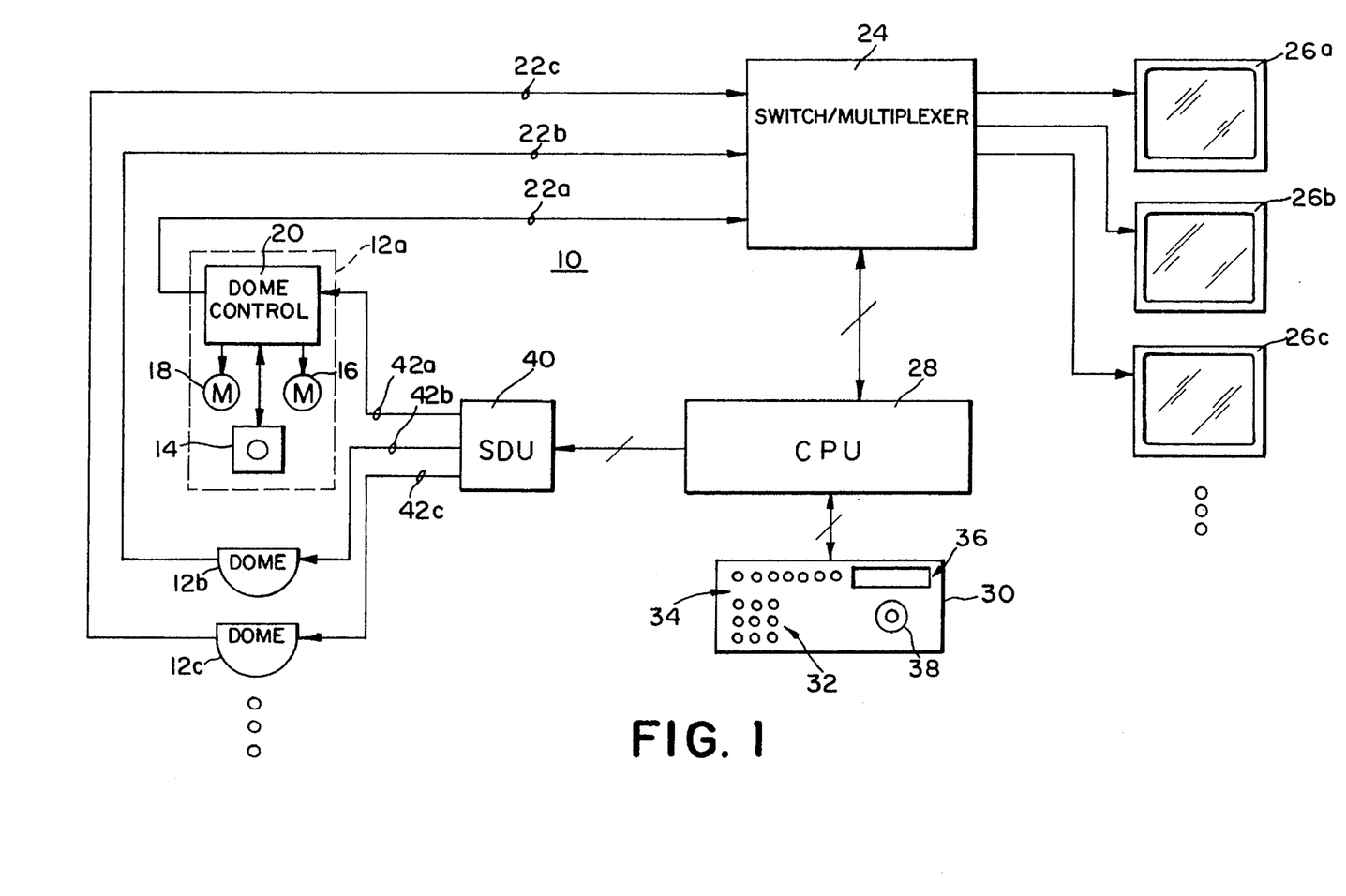
FIG. 1 is a functional block diagram of a video surveillance system.

Referring now to FIG. 1, there is shown a video surveillance system 10. The surveillance system 10 includes a plurality of remote surveillance units 12a, 12b, and 12c. The surveillance units 12a, 12b, and 12c are of the type disclosed in commonly-owned, copending application entitled "Surveillance Camera System", filed on Jun. 22, 1994, as application No. 08/263,918 and incorporated by reference herein. Each of the surveillance units 12a, 12b, and 12c is configured as shown in reference to surveillance unit 12a, and includes a video camera 14. The camera 14 is mounted within a translucent hemispherical dome that is preferably attached to, or suspended from, a ceiling at the location in which the surveillance unit 12a is deployed. The camera 14 is attached to a universal mounting (not shown) which is capable of orienting the camera at a selected horizontal angle (or pan coordinate) by a pan motor 16, and at a selected vertical declination (or tilt coordinate) by a tilt motor 18. Additionally, the pan motor 16 and the tilt motor 18 are operative to vary the pan and tilt coordinates of the camera at one or more selected angular velocities.

Each of the cameras within the respective surveillance units 12a, 12b, and 12c produces a video signal that is transmitted, by respective video cables 22a, 22b, and 22c, to a video switcher/multiplexer 24. The video switcher/multiplexer 24 is preferably of the type which is operative to receive a plurality of video signals, such as from video cables 22a, 22b, and 22c, and to cause the corresponding images to be displayed upon one or more video monitors 26a, 26b, and 26c. For example, the respective images may each be shown on an assigned monitor. Alternatively, two or more of the respective images may be displayed on a single monitor by using a selected-image, switching sequence.

The manner in which the switcher/multiplexer 24 displays incoming video signals upon the monitors 26a, 26b, and 26c is determined by control signals that are provided to the switcher/multiplexer 24 by a central processing unit, CPU 28, which is connected to the switcher/multiplexer 24. The CPU 28 is also connected with a user interface 30 that preferably includes a keypad 32 for providing alpha-numeric information to the CPU 28, a plurality of function keys 34 for causing the CPU 28 to execute pre-determined procedures, an alpha-numeric display 36 for displaying information pertaining to the status of the surveillance system 10, and an analog input device such as a joystick 38 for providing analog positioning information to the CPU 28.

By pressing an appropriate sequence of function keys 34 and/or alpha-numeric keys 32 during operation of the surveillance system, a user can inform the CPU 28, of the desired image, or sequences of images, to be displayed by the switcher/multiplexer 24 upon the monitors 26a, 26b, and 26c. The CPU 28 is programmed to cause an appropriate prompt to appear in the display 36 to assist the user in entering such information. Then, the CPU 28 downloads the entered information to a sequencer within the switcher/multiplexer 24 so that the video images will be displayed in the desired manner. Alternatively, the CPU 28 is programmed to control the switching and display functions of the switcher/multiplexer in "real-time" as the operation of the surveillance system proceeds. The user interface 30, CPU 28 and switcher/multiplexer 24 are preferably of the type manufactured and sold by Burle Industries of Lancaster, Pa. as the ALLEGIANT video switching system.

In addition to controlling the switcher/multiplexer 24, the CPU 28 also provides the user with the ability to issue a variety of commands from the keyboard to the remote surveillance units 12a, 12b, and 12c. Particular ones of such commands and the manner in which such commands are effected within the surveillance system shall be described hereinbelow in greater detail. In general, the user specifies a command by operating the user interface 30 according to a pre-determined sequence, such as pressing a function key 34 to select a command, and then specifying a camera, via the keypad 32, to which the command pertains. Such commands are accompanied by additional user inputs, such as numeric parameters or joystick positions, that are pertinent to execution of the commands. Upon detecting that a command is to be sent to a specified surveillance unit, the CPU 28 provides a corresponding command signal to a signal distribution unit, SDU 40.

The SDU 40 receives command signals from the CPU 28 and, in turn, broadcasts a serial-encoded, digital command word to the surveillance units 12a, 12b, and 12c via respective twisted-pair cables 42a, 42b, and 42c. Each remote surveillance unit 12a, 12b, and 12c includes a dome control system 20 (i) for receiving command words over the associated twisted-pair cable, (ii) for decoding the command words received from the associated twisted-pair cable, and (iii) for effecting an appropriate response within the surveillance unit.

Each dome control system 20 is provided with a unique address code by which the SDU 40 identifies the surveillance unit for which a particular command is intended. For example, each command word issued by the SDU to the surveillance units includes a command prefix, comprising an attention signal and the address code of the surveillance unit for which the command word is intended. Then, each dome control system 20 responds only to command words which include the correct command prefix. The remaining portion of the command word includes a command code identifying the command, and one or more parameters associated with the command.

In an alternative embodiment, the address code of each dome control system is used to identify a frame interval during which the dome control system will respond to commands issued by the SDU 40. In such an embodiment, the SDU 40 issues command words during distinct frame intervals between periodic synchronization signals. Each dome control system then responds only to command words within its assigned interval. Various other arrangements for delivery of commands from the CPU 28 to the remote surveillance units are possible within the scope of the present invention.

Representative command words that are issued to a remote surveillance unit are the commands listed in Table 1. Each of the commands in Table 1 is represented by a unique digital signal. Certain ones of the commands in Table 1 are broadcast by the SDU 40 in conjunction with one or more numeric or logical arguments as indicated in Table 1. Alternatively, any of the commands which take a logical argument, such as AUTO-FOCUS <ON/OFF>, may be implemented as two separate commands which each indicate one of the conditions of the argument, for example AUTO-FOCUS-ON and AUTO-FOCUS-OFF.

TABLE 1

| FUNCTION | COMMAND | ARGUMENT |
|---|---|---|
| MEMORY: | PRESET | <#> |
| | RECALL | <#> |
| MOTION: | PAN | <VELOCITY> |
| | TILT | <VELOCITY> |
| | ZERO | |
| LENS CONTROL: | AUTO-FOCUS | <ON/OFF> |
| | FOCUS | <IN/OUT> |
| | AUTO-IRIS | <ON/OFF> |
| | IRIS | <OPEN/CLOSE> |
| | ZOOM | <IN/OUT> |
| IMAGING: | SHUTTER | <SPEED> |
| | AUTO-WHITE | <ON/OFF> |
| | RED | <INCREASE/DECREASE> |
| | BLUE WHITE-SET | <INCREASE/DECREASE> |
| TIMING: | LINE-PHASE | <INCREASE/DECREASE> |

The actions that are effected within a remote surveillance unit in response to receiving the commands listed in Table 1, pertain to the general categories of motion control, lens control, and image control. The PRESET command provides the user with the ability to define and to store a combination of two or more camera control parameters. The RECALL command allows the user to instruct each of the surveillance units to operate according to the stored parameters.

Each of the commands listed in Table 1 shall now be described with reference to FIG. 2 wherein there is shown a more detailed diagram of a surveillance unit 12a.

Command words issued from the SDU 40 are received via twisted-pair cable 42a at a receiver/decoder 44. The command words received over twisted-pair cable 42a are preferably encoded in a bi-phase, or pseudoternary serial code. The receiver/decoder 44 converts the received command words into a format, such as 5-volt TTL, which is then provided to a dome microcontroller 46. The dome microcontroller 46 preferably includes an MC68HC16 microcontroller manufactured by Motorola, Incorporated.

Upon receipt of a command word, the microcontroller 46 first compares the address prefix of the command word to an address code assigned to the remote surveillance unit 12a. The address code is assigned to the surveillance unit 12a according to the position of a thumbwheel switch (not shown) or by a similar device for providing a code to the dome microcontroller 46. If the received command prefix does not match the pre-determined address of the surveillance unit 12a, then the command is ignored and no further action is taken by the dome microcontroller 46 in response to the received command word. If the received command prefix matches the pre-determined address of the surveillance unit 12a, then the dome microcontroller 46 responds to the received command word, and any parameters associated therewith, in accordance with instructions stored in EPROM 48.

In alternative embodiments, the predetermined addresses may be assigned to the remote surveillance units in various ways, such as DIP switch settings or numerical values stored in predefined non-volatile memory locations.

The specific actions taken by microcontroller 46 in response to a received command word intended for the surveillance unit 12a shall now be described in greater detail.

Camera Motion

The dome microcontroller 46 is programmed to control the pan and tilt motors in response to the PAN and TILT commands and to maintain a record of the instantaneous angular position of the camera. Referring back to FIG. 1, the user may press an appropriate function key 34 and a numeric key 32 to inform the CPU 38 that the user desires to adjust the angular coordinates of the camera 14, within surveillance unit 12a. The CPU 28 then displays an appropriate message on display 36 informing the user that the specified camera has been selected for such control. The CPU 28 periodically samples the X and Y positions of joystick 38. The user may then deflect the joystick 38 in the X and/or Y directions in order to indicate the desired direction of angular motion of the camera in the respective pan and tilt directions. Additionally, the desired speed of such angular motion can be specified by the user according to the extent to which the joystick is deflected in the desired direction. The CPU 28 also selects, for each axis of movement, a digital value or values representing the desired angular velocity (i.e., the speed and direction) in each of the pan and tilt axes.

For example, if the joystick is deflected only in the X direction, the CPU 28 selects a digital code representing the desired pan velocity. Then the CPU 28 issues a PAN command to the SDU, along with the velocity code.

If the joystick is moved in the X and Y directions simultaneously, then the CPU 28 selects a first digital code representing the desired pan velocity, and a second digital code representing the desired tilt velocity. Separate PAN and TILT commands are then provided to the SDU 40 for transmission to the surveillance units. The SDU 40 then broadcasts the corresponding command words successively.

Referring again to FIG. 2, the dome microcontroller 46 responds to receipt of the PAN or TILT commands by issuing a corresponding control signal to pan motor driver 50 or to tilt motor driver 52. Pan motor driver 50 is a motor control circuit that receives a control signal from the dome microcontroller 46 and in response thereto causes pan motor 16 to operate so as to pan the camera at the desired pan velocity. Similarly, tilt motor driver 52 receives a control signal from dome microcontroller 46 and in response thereto causes tilt motor 18 to operate so as to tilt the camera at the desired tilt velocity.

The selected pan and tilt velocities are maintained by the respective drive circuits 50 and 52 until new values are received from the microcontroller 46. For example, when the user releases the joystick 38, the dome microcontroller 46 will in due course receive appropriate PAN and TILT commands from the SDU 40 indicating that the pan and tilt velocities are to be set to zero. At such time, the dome microcontroller 46 updates the respective pan and tilt control signals provided to motor drivers 50 and 52 in order to stop motors 16 and 18.

Pan motor 16 and tilt motor 18 are preferably stepper motors of the well-known type which provide accurate open-loop positioning and are controllable by well-known digital circuitry. In an alternative embodiment, another type of motor, such as a servomotor, is employed.

In addition to providing control signals to the pan and tilt drivers 50 and 52, the dome microcontroller 46 continuously computes and maintains a record of the instantaneous angular coordinates of the camera. Since the pan and tilt motors are preferably driven in an open-loop manner, the dome microcontroller 46 is programmed to execute an initial "homing" procedure when the surveillance unit is initially powered. During the homing procedure, the pan and tilt motors are positioned to a pre-determined pair of angular coordinates so that the microcontroller 46 can than properly compute the instantaneous position of the pan and tilt motors by "dead reckoning". For example, the dome microcontroller 46 may maintain a count of the impulses applied to the stepper motors during movement of the camera. Alternatively, the dome microcontroller may integrate the velocity values obtained during operation of the surveillance system.

Because the pan and tilt motors are preferably controlled in an open-loop manner, positional errors may accumulate in the computed angular coordinates relative to the actual angular coordinates of the camera. In order to eliminate such errors, the user may initiate execution of the homing procedure using the ZERO command. Alternatively, or in addition thereto, the pan and tilt mechanism may be provided with appropriate sensors connected with the dome microcontroller 46, for detecting when the camera is in a predetermined orientation. Then, the computed angular coordinates may be automatically re-ZEROED whenever the positional sensors are actuated.

The instantaneous angular coordinates of the camera are stored within internal registers of the dome microcontroller 46. Whenever a PRESET command is received by dome microcontroller 46, the instantaneous angular coordinates are stored in the EEPROM 56 at a location determined by the numeric argument of the PRESET command. Whenever a RECALL command is received by the dome microcontroller 46, the stored coordinates are retrieved from the EEPROM 56 and compared with the instantaneous coordinates of the camera. Then, the dome microcontroller 46 computes the required angular velocities in the pan and tilt directions to effect positioning of the camera according to the retrieved coordinates. After the required velocities have been computed, the dome microcontroller 46 actuates the pan and tilt drives 50 and 52 in order to position the camera in accordance with the retrieved coordinates.

The numeric argument associated with the PRESET and RECALL commands may be used to specify which of a plurality of stored coordinates are to be stored and retrieved. The user may specify the argument of the PRESET and RECALL commands as a decimal integer which is converted by the dome microcontroller 46 into a base EEPROM address for retrieving the stored coordinates and any other parameters that may be stored in response to a PRESET command. The coordinates that are retrieved by a RECALL command are the same coordinates which were stored previously in response to a previous PRESET command having the same numeric argument. The CPU 28 keeps a record for each surveillance unit of how many sets of coordinates have been stored. The CPU 28 is programmed to ignore the command, if the user specifies an undefined RECALL argument. Alternatively, the dome microcontroller 46 is programmed to ignore RECALL commands having an undefined argument.

Lens Control

The camera 14 includes a lens system 58 and an imaging system 60. The lens system 58 includes a zoom lens 62 having an adjustable iris. The lens system 58 also includes lens controller 64 which provides electro-mechanical control of the iris opening, focus, and zoom factor of the lens. A preferred lens system 58 is the model 55YD lens system manufactured by Tamron Corporation of Japan.

Zoom lenses are known which include a complex mechanical arrangement whereby the effective iris opening is automatically increased when the zoom factor of the lens is increased. Because such lenses tend to be relatively bulky, their use in remote surveillance units can limit the speed at which a camera can be positioned in a desired orientation. Additionally, such lenses require a larger dome housing than would be desirable in an unobtrusive surveillance unit. We have found that the use of a lens which does not provide such mechanical aperture compensation, such as the preferred lens mentioned above, allows a significant size reduction to be obtained in the construction of a remote surveillance unit and provides rapid positioning of the camera.

The lens controller 64 is connected with the dome microcontroller 46 via a four-wire synchronous serial connection 63. Communication from the dome microcontroller 46 to the lens controller 64 is conducted using a four-byte control token that includes a control byte, a zoom byte, a focus byte, and an iris byte. The control byte contains a code by which the lens controller 64 is instructed to operate according to one or more modes, including an autofocus mode, and auto-iris mode, or an external control mode.

In the external control mode, the lens controller 64 responds to the control token by setting the iris opening, the focal distance, and/or the zoom factor of the lens in accordance with values contained in the iris byte, the focus byte, and the zoom byte, respectively, of the control token.

In the auto-focus mode, the lens controller 64 utilizes an internal feedback mechanism to adjust the focus of the lens. The video signal produced by the imaging system 60 is supplied as an input to the lens controller 64 to allow the auto-focus mechanism to adjust the focus of the lens to maximize the degree of contrast in the video signal.

In the auto-iris mode, an internal control mechanism of the lens controller is employed to adjust the iris opening of the lens in order to maintain the amplitude of the video signal within a pre-determined range. The auto-iris mode of operation can be employed in combination with, or independently of, the auto-focus mode of operation.

In addition to receiving and responding to a control token from the dome microcontroller 46, the lens controller 64 is operative to issue a reply token to the dome microcontroller 46 when the lens controller receives a control token. The reply token is similar to the control token, and contains data fields into which the then-current status of the lens 62 is encoded. In order to obtain the current lens settings, the dome microcontroller 46 transmits to the lens controller a control token including a control byte that causes the lens controller 64 to issue a reply token without changing any of the current lens settings.

It will be readily appreciated that the incorporation of an automatic lens focusing mechanism into a video surveillance system greatly relieves the burden upon the user of the surveillance system who would otherwise expend considerable attention upon the task of adjusting the focus for each of multiple cameras.

The keyboard is equipped with an appropriate function key by which the operator signals to the CPU 28 to select manual focusing in connection with a particular camera. The CPU 28 is programmed to cause the SDU 40 to issue the AUTO-FOCUS <ON/OFF> command word to the indicated surveillance unit, e.g., surveillance unit 12a. The dome microcontroller 46 then receives the AUTO-FOCUS command and issues a control token to the lens controller in order to activate or to deactivate the auto-focus function as selected by the user. The keyboard is also equipped with an appropriate mechanism, such as a knob (not shown), by which the user indicates, in manual focus mode, whether the focal distance is to be increased or decreased. During manual focus operation, the CPU causes the SDU 40 to periodically issue FOCUS <IN/OUT> command words to the selected camera in response to the user's manipulation of the focusing knob. As each FOCUS command is received by the dome microcontroller 46, the dome microcontroller 46 obtains the current focus value from the lens controller 58 and then issues a control token to the lens controller wherein the value of the focus byte is increased or decreased in accordance with the user's action.

As has been discussed previously, the dome microcontroller 46 operates to record selected angular coordinates and to rapidly position the camera in response to the RECALL command. It may occur in a given application that one such recorded orientation has been selected by the user to provide a view of an area that is close to the camera, and another recorded orientation has been selected to provide a view of a second area that is relatively more distant from the camera. Contemporaneously, it may happen that the relative distances from the camera are such that different focal positions of the lens would be required to provide a sharp image in the respective recorded orientations. If the camera is being operated in the manual focus mode, the operator would be required to adjust the focus of the lens each time that the RECALL command is issued in order to alternately view the two selected areas. If the camera is being operated in the auto-focus mode, then a time delay occurs while the auto-focus mechanism adapts to each view whenever the RECALL command is issued. Depending upon the relative distances to the objects of interest and the nature of the image content of the areas of interest, the adaptation time of the auto-focus mechanism could be sufficiently long to annoy the user or to cause the user to miss an important event in one of the selected areas.

In order to provide more rapid focusing of the lens, the dome microcontroller 46 is programmed to store the then-current focus byte value into the EEPROM 56 whenever the PRESET command is received. The focus byte is stored in association with the angular coordinates that are also stored in response to the PRESET command as described previously herein. Subsequently, whenever a RECALL command is received by the dome microcontroller 46, the focus value pertaining to the specified preset can then be retrieved and issued to the lens controller by the dome microcontroller in a control token. In this manner the camera is positioned in the desired orientation and properly focused in a more rapid manner than previously known because the need to refocus the camera or to wait for adaptation of the auto-focus mechanism is eliminated.

The AUTO-IRIS, IRIS, and ZOOM commands operate upon the function of the lens system in order to set or adjust the iris and zoom parameters of the lens system 58 in the same manner as has been described in connection with the focus parameter.

According to the procedures discussed in connection with storing and recalling selected focal settings in response to the PRESET and RECALL commands, the dome microcontroller is further programmed to store and recall the current values of the iris byte and/or the zoom byte of the lens reply token in response to the respective PRESET and RECALL commands. Hence, the operational parameters pertaining to the lens system can be rapidly retrieved and effected for each of a plurality of preselected angular coordinates.

In an alternative embodiment, the user specifies which of the lens parameters are to be stored and recalled in response to the PRESET and RECALL commands. For example, the desired combination of lens parameters is selected via the keyboard and then included as an additional argument of the PRESET command. If a subset of the possible lens parameters is stored as a preset, then the EEPROM locations that would otherwise be occupied with the non-selected parameters are provided with a null, or "don't care", code. In such an embodiment, the dome microcontroller 46 responds to a RECALL command by providing a control token to the lens controller containing the retrieved parameters in the selected fields, and the then-current parameters in the non-selected fields of the control token.

Imaging

The imaging system 60 of the camera 14 includes an imaging device, such as a charge-coupled device (CCD) 66, positioned behind the lens 62. The CCD 66 is preferably a Sony ICX054AK ⅓-inch color CCD array. The CCD 66 is electrically driven by a driver circuit 68 which provides the necessary timing signals to operate the CCD 66. The driver circuit preferably includes a Sony CXD1257AR CCD camera timing generator in addition to other circuitry for generating horizontal and vertical synchronization signals used in producing a video signal. The synchronization signals produced by the CCD driver 68 are provided to a video processing subsystem 70. The video processing subsystem 70 includes sampling circuitry for extracting signals from the CCD 66, processing circuitry for adjusting image features such as white balance, and an encoder for converting the image into a standard composite video format, such as the NTSC format or the PAL format. The imaging system 60 further includes an imaging controller 72. The imaging controller 72 communicates with the dome microcontroller 46 via a two-wire asynchronous serial TTL connection 71. The imaging controller 72 provides control signals to the CCD driver 68 for establishing a time interval used by the CCD driver 68 to control the integration time, or shutter speed, of the CCD 66.

In order to provide the user with the ability to remotely set or adjust the shutter speeds of the various cameras in the surveillance system 10, the CPU 28 is programmed to recognize shutter speed commands, entered by the user upon the user interface 30, and then to relay those commands to the SDU 40. For example, the user specifies a particular camera and the shutter speed of the specified camera by pressing appropriate keys on the keyboard. Upon receiving an appropriate signal from the CPU 28, the SDU 40 broadcasts the SHUTTER <SPEED> command word to the surveillance units along with the proper command prefix.

Referring back to FIG. 2, the SHUTTER command is received, via twisted-pair 42a, by the receiver 44 and then provided to the dome microcontroller 46. The dome microcontroller 46 is programmed to respond to the SHUTTER command by requesting the current shutter speed setting from the imaging controller 72, which maintains a record of the current shutter speed. The dome microcontroller 46 then issues a control signal on the serial connection 71 indicating that the shutter speed is to be set to the newly-received value.

Figure 3:
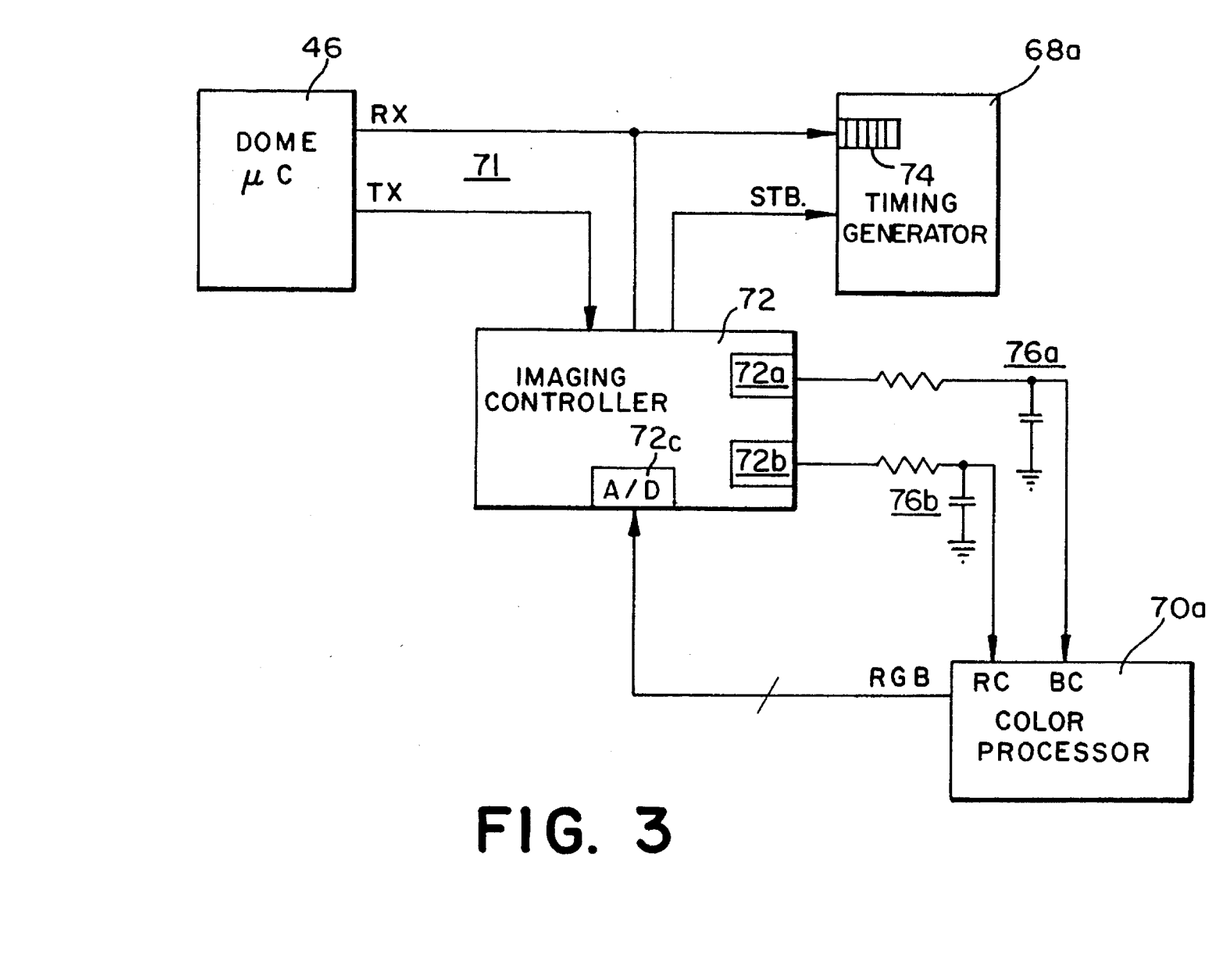
FIG. 3 is a partial schematic diagram showing certain communication and control connections among elements of the remote surveillance unit of FIG. 2.

Referring now to FIG. 3, the serial connection 71 includes a transmit line, TX, and a receive line, RX. The transmit line TX provides transmission of serial data from the dome microcontroller 46 to the imaging controller 72. The receive line RX provides transmission of serial data from the imaging controller 72 to the dome microcontroller 46. The receive line RX is also connected with an internal shift register 74 of a CCD camera timing generator 68a, which is part of the CCD driver circuitry 68. One such timing generator is the Sony CXD1257AR. The shift register 74 of the timing generator 68a is connected to an internal gating mechanism of the timing generator 68a so that the data held in the shift register 74 is gated into a shutter speed register of the timing generator 68a whenever a strobe pulse is applied to the STB input of the timing generator 68a. When the imaging controller 72 detects that a shutter speed setting has been transmitted on signal line TX by the dome microcontroller 46, the shutter speed is then transmitted by the imaging controller 72 upon the RX line, and followed by a pulse applied to the STB line by the imaging controller 72.

The imaging controller 72 maintains a record of the current shutter speed, and updates the current shutter speed each time that the shutter speed is adjusted. The imaging controller is further programmed to send the current shutter speed setting to the dome microcontroller 46, via signal line RX, whenever such information is requested by the dome microcontroller 46.

Since the dome microcontroller 46 obtains and sets the current shutter speed of the camera, the shutter speed can be included among the parameters that are stored when a PRESET command is issued. The stored shutter speed values can be retrieved by the dome microcontroller 46 and then issued to the imaging system when a RECALL command is received by the dome microcontroller 46. Thus, the user is provided with the ability to cause the dome microcontroller to record a plurality of camera configurations each having an associated shutter speed so that such configurations may be recalled in swift response to changing lighting conditions or in response to movement within the monitored area.

The white balance of the video image is determined by control inputs RCNT and BCNT of a color processor 70a, which is part of the video processing subsystem 70. In the preferred embodiment, the color processor 70a is a Sony CXA1391Q/R processor that requires a 0–5 volt analog voltage on the RCNT and/or BCNT inputs in order to specify the levels of red and/or blue gain to be applied to the signal from the CCD relative to the green level. In order to provide such analog control voltages to the color processor 70a from the imaging controller 72, a pair of digitally-controlled pulse-width modulators 72a and 72b are employed within the imaging controller 72 to produce square waves having duty cycles that are proportional to the respective desired analog control voltages (as a proportion of the supply voltage). The duty cycles of the pulse width modulators 72a and 72b are controlled by internal data registers of the imaging controller 72.

The square wave from pulse-width modulator 72a is connected with an RC network 76a. The RC network 76a averages the square wave from the pulse-width modulator 72a, and the resulting average voltage is applied to the BCNT input of the color processor 70a. Similarly, the square wave from pulse-width modulator 72b is averaged by RC network 76b and then provided to the RCNT input of color processor 70a.

The numerical values which are used to regulate the duty cycle of pulse-width modulators 72a and 72b are determined by imaging controller 72 as follows. If the user desires to have the white balance of the camera continuously and automatically adjusted, the user specifies such operation by pressing an appropriate function key on the user interface. Such a request causes the AUTO-WHITE command word to be received by the dome microcontroller 46. The dome microcontroller 46 informs the imaging controller 72, via signal line TX, that such a request for automatic white balancing has been received.

As can be seen in FIG. 3, the color processor 70a provides several analog output signals, collectively designated RGB. The RGB outputs of the color processor 70a are connected with an analog-to-digital converter 72c of the imaging controller 72. The RGB signals are representative of the spatial average of the respective red, green, and blue amplitude levels in the image detected by the CCD 66. The imaging controller 72 is programmed to execute a feedback control procedure whereby the duty cycles of the pulse-width modulator 72a and 72b are adjusted to obtain a pre-determined relationship among the average levels of red, green, and blue in the detected image and as provided to the imaging controller 72 by the A/D converter 72c. Such a feedback control mechanism requires a certain amount of adaptation time in order to properly adjust the white balance when the camera is rapidly oriented toward areas having different color temperatures. Additionally, false adaptation of the white balance control mechanism can occur if the color content of the monitored area does not exhibit the assumed statistical relationship among the red, green, and blue levels which the feedback mechanism is programmed to attain.

In order to avoid the last-mentioned potential difficulties in obtaining and maintaining an accurate white balance, the surveillance system is preferably arranged to allow the user to manually specify the desired levels of red and blue compensation using the respective increase RED and BLUE commands. When these commands are received by the dome microcontroller 46, they are then relayed to the imaging controller 72 via the TX line. The imaging controller 72 then increments or decrements the appropriate control register pertaining to the pulse-width modulator 72a or 72b responsible for the specified red or blue gain. In order to substantially eliminate adaptation time or false adaptation from the white balance control mechanism, the control parameters used to drive the pulse width modulators 72a and 72b, whether set automatically or manually, are preferably included among the other parameters that are stored by the dome microcontroller 46 in response to a PRESET command. For example, when a PRESET command is received by the dome microcontroller 46, the dome microcontroller 46 subsequently issues a request via signal TX, for the imaging controller 72 to obtain the current values of the control parameters governing each of the pulse-width modulators 72a and 72b. These parameters are then sent to the dome microcontroller 46 via the RX connection and subsequently stored in the EEPROM in association with the other parameters stored in response to a PRESET command. Subsequently, when a corresponding RECALL command is received, the white balance setting is retrieved by the dome microcontroller 46 and transmitted to the imaging controller 72 via the TX line. The imaging controller then adjusts the pulse-width modulators 72a and 72b in order to restore the memorized white balance levels.

In addition to the RED and BLUE commands, the WHITE-SET command may be specified by the user in situations wherein it is desirable to momentarily actuate white balancing and subsequently to retain the RED and BLUE gain settings. For example, rather than to manually adjust each of the RED and BLUE gain settings, the user may position the camera to view a white object or area within the monitored location. Then, the user may specify the WHITE-SET command. This command is then relayed from the CPU 28, and the SDU 40, to the remote surveillance units 12a–c. The dome microcontroller within the specified remote surveillance unit will then issue a command to the associated imaging controller to perform momentary automatic white balancing.

Momentary automatic white balancing is accomplished by the imaging controller by executing the automatic white balancing procedure for a predetermined period of time, and then maintaining the resulting control values within the control registers associated with the pulse-with modulators.

As can be appreciated, the surveillance system of the present invention provides the ability to store and to recall a variety of imaging parameters in association with selected angular coordinates of the camera. Other parameters in addition to the ones discussed hereinabove may also be stored and recalled in a similar manner. For example, the preferred processing circuitry can be set to provide exposure compensation for scenes in which the subject of interest is illuminated from behind the subject relative to the camera. Such "backlight compensation" can be requested by the user in a manner similar to that described in connection with automatic white balance. Additionally, the presence or absence of backlight compensation may be among the parameters stored and/or recalled in connection with the PRESET or RECALL commands.

Timing

Figure 2:
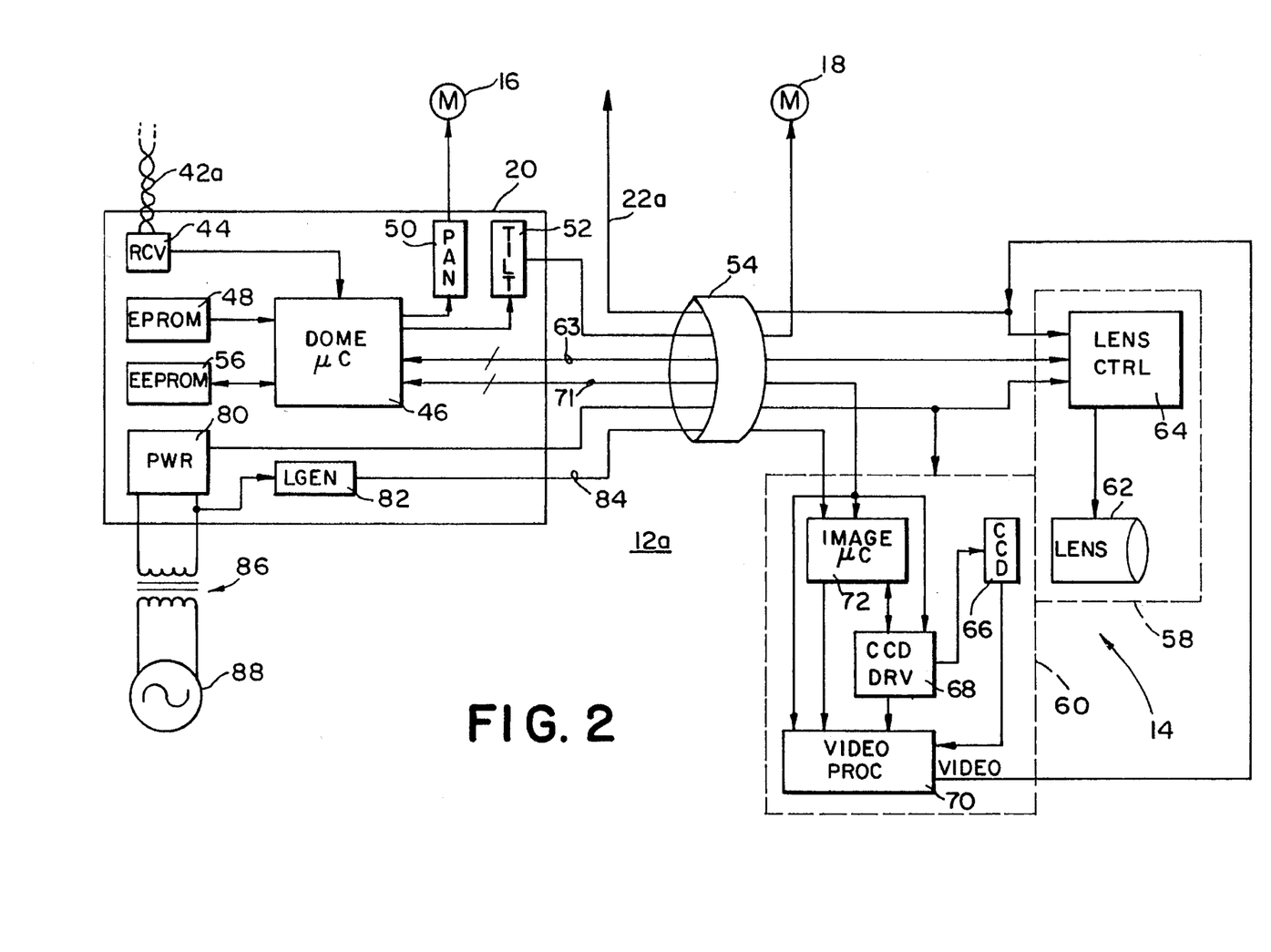
FIG. 2 is a functional block diagram of a remote surveillance unit of the surveillance system of FIG. 1.

As shown in FIG. 2, the dome control system 20 includes a power supply circuit 80, comprising several voltage regulators, for supplying electrical power to the other components of the dome control system 20 and to the pan motor 16, the tilt motor 18, the lens system 58, and the imaging system 60. The power supply circuitry 80 is connected, via transformer 86, to a source of AC power that is local to the remote surveillance unit 12a.

Associated with the power supply circuitry is a linelock reference generator 82. The linelock reference generator 82 receives an AC signal from the transformer 86 and preferably includes a zero-crossing detector for generating a TTL-compatible linelock reference signal that is synchronized to the AC signal from the transformer 86. The linelock reference signal from the linelock reference generator 82 is provided, via signal line 84, to the imaging controller 72. The imaging controller 72 is programmed to detect signal transitions on line 84 and, in response thereto, provide a synchronization reference signal to a phase-locked loop in the timing circuitry 68. Such a phase-locked loop is provided within the timing circuitry 68 in order to drive a vertical synch generator which produces the vertical synch signals for the CCD driver of the timing circuitry 68, and the composite video encoder of the video processor 70.

The imaging controller 72 utilizes an internal delay mechanism to provide the synchronization reference signal to the timing circuitry 68 in accordance with a selected degree of phase lag relative to the input signal on signal line 84 from the linelock reference generator 82. The degree of phase lag applied to the synchronization reference signal is determined by a delay value contained in an internal register of the imaging controller. Thus, the relative phase lag between the local AC power supply 88 and the vertical synch component of the composite video signal produced by the video processor 70, is determined by the delay value.

In the surveillance system 10 of FIG. 1, wherein video cameras are employed at a plurality of remote locations, it may happen that the vertical synch component of the composite video signals arriving at the video switcher/multiplexer 24 are relatively out of phase. For example, the local AC power circuits serving the remote surveillance units may be provided by different branches of a three-phase AC power system in the monitored facility. An undesirable effect of such an out-of-phase condition is a momentary loss of vertical hold in a video monitor that is provided with a switched sequence of signals from the remote cameras by the video switcher/multiplexer. The resulting "roll" in the image on the video monitor can be distracting to the user of the surveillance system. In order to synchronize the remote surveillance units with respect to one another, the user presses an appropriate key sequence to cause the CPU 28 to issue the LINE-REF <INCREASE/DECREASE> command word, via the SDU 40, to a specified camera.

Upon receiving the LINE-REF command word, the dome microcontroller 46 instructs the imaging controller 72, via serial connection 71, to increase or decrease the value contained within the register responsible for determining the phase lag between the linelock reference signal produced by the linelock reference generator 82, and the synchronization reference signal provided to the timing circuitry 68.

Figure 4:
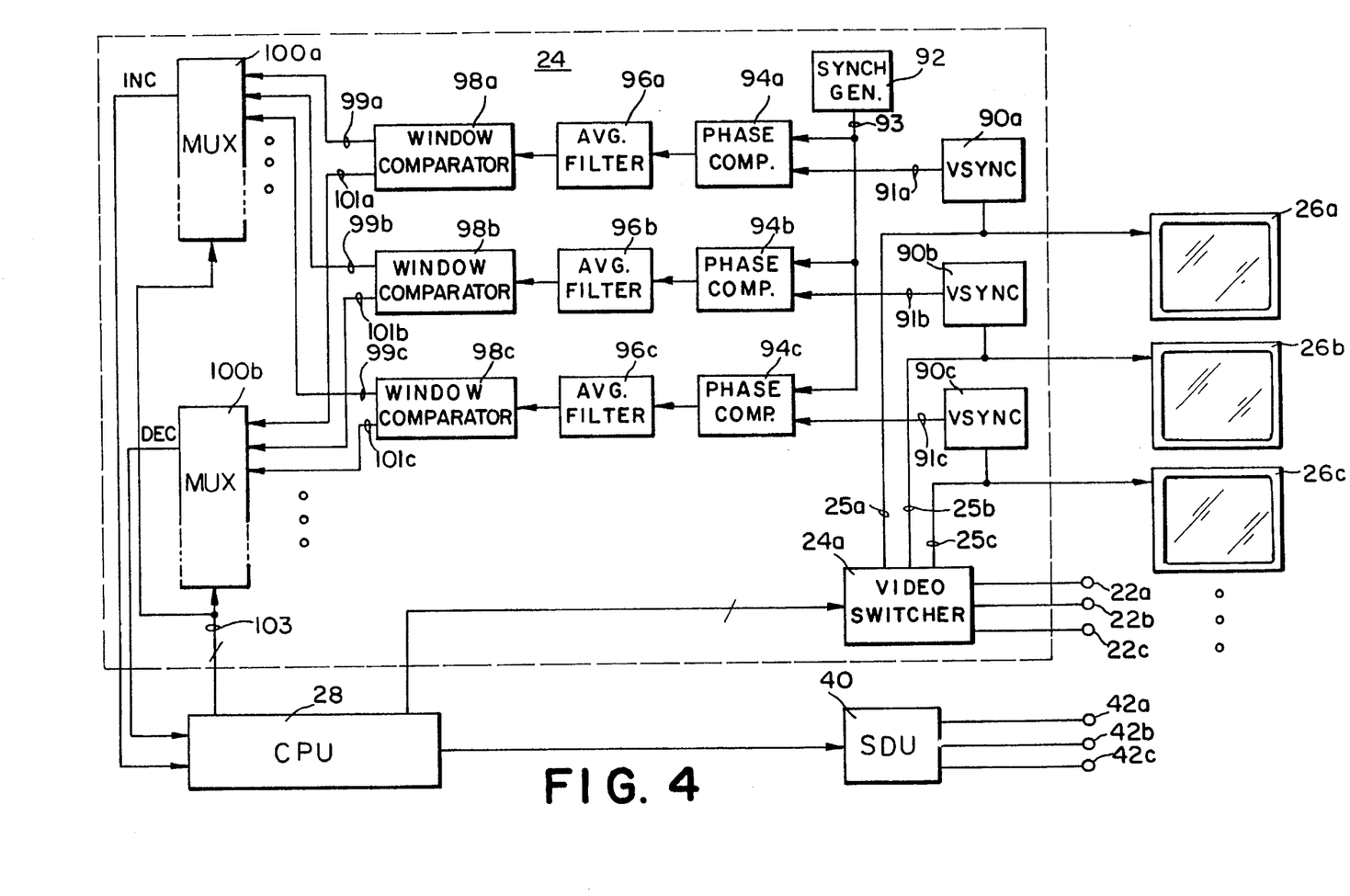
FIG. 4 is a partial schematic diagram of an arrangement for automatically detecting and adjusting the relative phase of the vertical synchronization component of composite video signals received from a plurality of remote surveillance units.

When the surveillance system is initially installed, the user can program the video switcher/multiplexer 24 to switch between two or more remote surveillance units and to provide the corresponding images alternately upon a single video monitor. Then, by watching the monitor, the user can adjust the relative phase of the received composite video signals until no image roll is observed when switching occurs. After adjusting the relative phase between one pair of composite video signals, the user adjusts the phase of the composite video signals from the remaining remote surveillance units in a similar manner. In order to provide greater phase adjustment accuracy and to relieve the operator from manually adjusting the relative phase of each of several remote surveillance units, an automatic remote phase adjustment system is implemented as shown in FIG. 4 and described hereinbelow.

As has been described, the video switcher/multiplexer 24 receives video signals from the remote surveillance units via signal lines 22a–c. The video switcher/multiplexer 24 includes switching circuitry 24a responsive to control signals from the CPU 28, for causing selected input video signals to be displayed upon monitors 26a–c in accordance with the pre-determined switching sequence. Video signals are provided from the switching circuitry 24a to the monitors 26a–c via respective signal lines 25a–c.

Vertical synchronization stripper circuits 90a–c are connected to each of the corresponding video signal lines 25a–c. Each of the stripper circuits 90a–c is of the type which isolates the vertical synchronization component of a composite video signal. Hence, the stripper circuits 90a–c provide, on signal lines 91a–c, the vertical synchronization components of the video signals present on respective signal lines 25a–c.

The synchronization signals on signal lines 91a–c are each connected to one input of respective phase comparators 94a–c. The other input of each of the phase comparators 94a–c is connected, via signal line 93, to a vertical synchronization generator 92. The vertical synchronization generator 92 provides a reference vertical synchronization signal with which each of the signals on lines 91a–c is compared by the respective phase comparators 94a–c. The phase comparators 94a–c are preferably digital phase comparators of the type which provide a pulsed logic-level output signal indicating the direction and degree of phase difference between two input signals. Each of the phase comparators 94a–c produces a pulsed, digital output signal indicative of the difference between the reference vertical synchronization signal on line 93 and the respective vertical synchronization signals from the stripper circuits 90a–c.

The output of the phase comparators 94a–c are each provided to respective averaging filters 96a–c. Each of the averaging filters 96a–c is formed to convert the pulsed digital signal, from the respective associated phase comparator 94a–c, into an analog voltage signal. The phase comparators 94a–c and the filters 96a–c are arranged so that, for example, if the reference vertical synchronization signal upon line 91a leads the vertical synchronization signal on line 93, then the filter 96a produces an analog voltage that is greater than one-half of the circuit supply voltage. Conversely, if the video synchronization signal on line 91a lags the reference vertical synchronization signal on line 93, then the filter 96a produces an analog voltage which is less than one-half of the supply voltage.

The analog voltage produced by filters 96a–c are provided to respective window comparators 98a–c. Each of the window comparators 98a–c is arranged to compare the input voltage with a pre-determined upper reference level and to produce a high logic-level signal upon respective signal lines 99a–c, in the event that the input voltage exceeds the pre-determined upper reference level. In this manner, if the phase delay associated with the remote surveillance unit responsible for producing the composite video signal on line 25a must be increased in order to synchronize with the reference vertical synchronization generator 92, then a high logic-level would be present on line 99a.

Conversely, each of the window comparators 98a–c is arranged to produce, on respective signal lines 101a–c, a high logic-level signal whenever the input voltage is below a pre-determined lower reference voltage. In this manner, the logic signals upon any of signal lines 101a–c represent whether it is necessary to decrease the phase delay within any of the remote surveillance units associated with the video signals present upon signal lines 25a–c, respectively.

In order to provide the phase adjustment information upon signal lines 99a–c and 101a–c, to the CPU 28 in an efficient manner, signal lines 99a–c are connected as inputs to a multiplexer 100a, and signal lines 101a–c are connected as inputs to a multiplexer 100b. The address lines of respective multiplexers 100a and 100b are connected in parallel with the CPU 28. The CPU 28 then provides an address, on address lines 103, to the multiplexers 100a and 100b, in order to determine whether a particular remote surveillance unit requires phase adjustment.

For example, during operation of the video switcher/multiplexer 24, the CPU may place, on address lines 103, an address which causes the output 99a of window comparator 98a to be gated to the output of multiplexer 100a (INC). Simultaneously, the output 101a of the window comparator 98a will be gated to the output of multiplexer 100b (DEC). The outputs INC and DEC of respective multiplexers 100a and 100b are provided as inputs to the CPU 28, so that the CPU 28 can determine, for a given address on lines 103, whether phase adjustment is required for the remote surveillance unit which is then producing the composite video signal on line 25a. Since the CPU 28 is also controlling the video switcher circuitry 24a, the CPU 28 can then issue the appropriate command to increase or decrease the phase delay in the identified remote surveillance unit. The command to increase or decrease the phase delay in the identified remote surveillance unit is then provided to the remote surveillance unit as has been described hereinabove.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. A video surveillance unit comprising:

a video camera that includes an adjustable lens and a lens controller, said adjustable lens having focus adjusting means and lens-iris adjusting means, and said lens controller being operatively connected to the adjustable lens for controlling operation of the focus adjusting means and the lens-iris adjusting means;

a data receiver circuit for receiving a data signal from a remote source, said data signal comprising an address signal and a control signal;

a surveillance unit controller operatively connected with said data receiver circuit and responsive to the data signal for comparing said address signal with an address assigned to the surveillance unit, for detecting the presence of a control signal intended for the surveillance unit, said surveillance unit controller being operatively connected to said lens controller for providing an operation-mode signal to said lens controller in response to said detected control signal, whereby the operational mode of said lens controller is selected from a group consisting of an autofocus mode, an auto-iris mode, a combined auto-focus/auto-iris mode, and an external control mode.

2. A video surveillance unit as set forth in claim 1 wherein the adjustable lens comprises a variable f-stop, zoom lens.

3. A video surveillance unit as set forth in claim 2 wherein said surveillance unit controller comprises means for providing a zoom-adjustment signal with said operation-mode signal to said lens controller, whereby the zoom factor of said adjustable lens can be changed when the operation-mode signal indicates the external control mode of operation for said lens controller.

4. A video surveillance unit as set forth in claim 2 wherein said surveillance unit controller comprises means for providing a focus-adjustment signal with said operation mode signal to said lens controller, whereby the focal distance of said adjustable lens can be changed when the operation-mode signal indicates the external control mode of operation for said lens controller.

5. A video surveillance unit as set forth in claim 2 wherein said surveillance unit controller comprises means for providing a lens-iris-adjustment signal with said operation mode signal to said lens controller, whereby the iris opening of said adjustable lens can be changed when the operation-mode signal indicates the external control mode of operation for said lens controller.

6. A video surveillance unit as set forth in claim 1 comprising a pan-and-tilt apparatus for supporting said video camera and orienting said video camera to one of a plurality of positions each defined by a pan coordinate and a tilt coordinate; and wherein said surveillance unit controller comprises:

pan-and-tilt control means for providing a pan direction signal, a tilt direction signal, a pan velocity signal, and a tilt velocity signal to said pan-and-tilt apparatus, whereby said pan-and-tilt apparatus can be driven to orient said video camera to a desired position;

pan-and-tilt position determining means for determining the pan and tilt coordinates of the video camera when in the desired position; and first data-storage means for storing the pan and tilt coordinates of the video camera.

7. A video surveillance unit as set forth in claim 6 wherein said surveillance unit controller comprises second data-storage means for receiving and storing a zoom adjustment setting from said lens controller in association with the stored pan and tilt coordinates, whereby a zoom-adjustment setting is preselected for a set of pan and tilt coordinates.

8. A video surveillance unit as set forth claim 6 wherein said surveillance unit controller comprises third data-storage means for receiving and storing a focus-adjustment setting from said lens controller in association with the stored pan and tilt coordinates, whereby a focus-adjustment setting is preselected for a set of pan and tilt coordinates.

9. A video surveillance unit as set forth claim 6 wherein said surveillance unit controller comprises fourth data-storage means for receiving and storing a lens-iris setting from said lens controller in association with the stored pan and tilt coordinates, whereby a lens-iris setting is preselected for a set of pan and tilt coordinates.

10. A video surveillance unit comprising:

a video camera that includes an adjustable lens, an imaging array, and an imaging controller, said imaging array being positioned to receive an optical image from the adjustable lens and being adapted to produce an array signal representing the optical image, and said imaging controller being operatively connected to said imaging array for providing a timing signal for adjusting the shutter speed of said imaging array; and a surveillance unit controller operatively connected to the imaging controller for providing a shutter-speed signal to said imaging controller, whereby the shutter speed of said imaging array can be adjusted.

11. A video surveillance unit as set forth in claim 10 comprising a pan-and-tilt apparatus for supporting said video camera and orienting said video camera to one of a plurality of positions each defined by a pan coordinate and a tilt coordinate; and wherein said surveillance unit controller comprises:

pan-and-tilt control means for providing a pan direction signal, a tilt direction signal, a pan velocity signal, and a tilt velocity signal to said pan-and-tilt apparatus, whereby said pan-and-tilt apparatus can be driven to orient said video camera to a desired position;

pan-and-tilt position determining means for determining the pan and tilt coordinates of the video camera when in the desired position; and first data-storage means for storing the pan and tilt coordinates of the video camera.

12. A video surveillance unit as set forth claim 11 wherein said surveillance unit controller comprises data-storage means for receiving and storing a shutter-speed setting from said imaging controller in association with the stored pan and tilt coordinates, whereby a shutter-speed setting is preselected for a set of pan and tilt coordinates.

13. A video surveillance unit as set forth in claim 11 wherein said video camera comprises:

a video processor connected to receive said array signal, for converting said array signal into a video signal, and for adjusting the white balance of the video signal relative to the array signal; and wherein said surveillance unit controller comprises means for providing an operation-mode signal to said imaging controller whereby the operational mode of the video camera is selected from a group consisting of an automatic white-balance mode, a manual white balance mode, and a white-balance set mode.

14. A video surveillance unit as set forth in claim 13 wherein said surveillance unit controller comprises means for providing a white-balance-adjustment signal to said imaging controller, said video processor comprises a color processor; and said imaging controller comprises means for providing a color adjustment signal to said color processor, whereby the white balance of the video signal can be adjusted when the operation-mode signal indicates the manual white-balance mode of operation for said video camera.

15. A video surveillance unit as set forth in claim 14 wherein said surveillance unit controller comprises second data-storage means for receiving and storing a white-balance setting from said imaging controller in association with the stored pan and tilt coordinates, whereby a white-balance setting is preselected for a set of pan and tilt coordinates.

16. A video surveillance unit comprising:

a source of an ac power signal; and a surveillance unit controller connected to said ac power signal source, said surveillance unit controller including a linelock reference generator for generating a linelock reference signal in response to the ac power signal;

a video camera that includes an adjustable lens, an imaging array positioned to receive an optical image from the adjustable lens and being adapted to produce an array signal representing the optical image, and a timing circuit operatively connected to the imaging array for providing a timing signal for adjusting the shutter speed of said imaging array; and an imaging controller operatively connected to the surveillance unit controller for receiving the linelock reference signal, said imaging controller including delay means for providing a synchronization reference signal to said timing circuit, said synchronization reference signal having a preselected delay relative to said linelock reference signal.

17. A video surveillance unit as set forth in claim 16 wherein said imaging controller comprises:

means for storing a delay value corresponding to the preselected delay in the synchronization reference signal;

means for receiving a delay value adjustment signal from said surveillance unit controller; and means for adjusting the delay value stored in said delay value storing means.

18. A video surveillance system comprising:

a video surveillance unit as set forth in claim 17;

a central control unit operatively connected to said video surveillance unit;

a video switcher/multiplexer connected for receiving a video signal from said video surveillance unit and for providing the video signal to a display monitor in accordance with instructions received said central control unit;

a synchronization signal stripper connected to receive the video signal provided by said video switcher/multiplexer, said synchronization signal stripper being adapted to extract a synchronization component from the video signal and to provide a first synchronization signal consisting of the synchronization component of the video signal;

a signal generator for providing a reference synchronization signal;

synchronization signal comparison means connected to receive the first synchronization signal and the reference synchronization signal and provide a phase delay adjustment signal to the central control unit, whereby a phase difference between the video signal and a reference video signal can be minimized.

19. A video surveillance system as set forth in claim 18 wherein said synchronization signal comparison means comprises:

a phase comparator responsive to the first synchronization signal and the reference synchronization signal for generating a difference signal representing the direction and degree of phase difference between the first synchronization signal and the reference synchronization signal;

a filter connected to receive the difference signal from said phase comparator and to provide an analog signal having an amplitude corresponding to the direction of phase difference between the first synchronization signal and the reference synchronization signal; and a window comparator connected to receive the analog signal from said filter and provide a first logic-level signal when the amplitude of the analog signal exceeds an upper reference amplitude or provide a second logic-level signal when the amplitude of the analog signal is below a lower reference amplitude, said first logic-level signal indicating to said central control unit that the delay value stored in said imaging controller is to be increased and said second logic-level signal indicating to said central control unit the delay value stored in said imaging controller is to be decreased, whereby the delay value is adjusted.

20. A video surveillance system as set forth in claim 19 comprising:

a first multiplexer connected to receive the first logic-level signal from said window comparator in association with an address corresponding to said video surveillance unit;

a second multiplexer connected to receive the second logic-level signal from said window comparator in association with an address corresponding to said video surveillance unit;

said first and second multiplexers being connected to receive an address from said central control unit and to provide a first or second logic-level signal associated with the received address to the central control unit.

21. A video surveillance unit, comprising:

a color video camera that includes an imaging array and an imaging controller having automatic white balance adjusting means and external white balance adjusting means; and a surveillance unit controller operatively connected to said imaging controller for providing an operationmode signal to said imaging controller, whereby the operational mode of said imaging controller is selected from a group consisting of an automatic white balance control mode and an external white balance control mode.

22. A video surveillance unit as set forth in claim 21 comprising a pan-and-tilt apparatus for supporting said video camera and orienting said video camera to one of a plurality of positions each defined by a pan coordinate and a tilt coordinate; and wherein said surveillance unit controller comprises:

pan-and-tilt control means for providing a pan direction signal, a tilt direction signal, a pan velocity signal, and a tilt velocity signal to said pan-and-tilt apparatus, whereby said pan-and-tilt apparatus can be driven to orient said video camera to a desired position;

pan-and-tilt position determining means for determining the pan and tilt coordinates of the video camera when in the desired position; and first data-storage means for storing the pan and tilt coordinates of the video camera.

23. A video surveillance unit as set forth in claim 22 wherein said surveillance unit controller comprises second data-storage means for receiving and storing a white balance adjustment setting in association with the stored pan and tilt coordinates, and for subsequently retrieving said white balance adjustment setting in association with the stored pan and tilt coordinates, whereby a white balance adjustment setting is preselected for a set of pan and tilt coordinates.

24. A video surveillance unit as set forth in claim 21 wherein said surveillance unit comprises a data receiver circuit for receiving a data signal from a remote source, said data signal comprising an address signal and a control signal; and wherein said surveillance unit controller is operatively connected with said data receiver circuit and responsive to the data signal for comparing said address signal with an address assigned to the surveillance unit, for detecting the presence of a control signal intended for the surveillance unit, and said surveillance unit controller is further configured for providing said operation mode-signal to said imaging controller in response to said detected control signal indicating one of said operating modes.

* * * * *